(No Model.)   2 Sheets—Sheet 1.
A. B. LANDIS.
VALVE GEAR.
No. 308,079.  Patented Nov. 18, 1884.
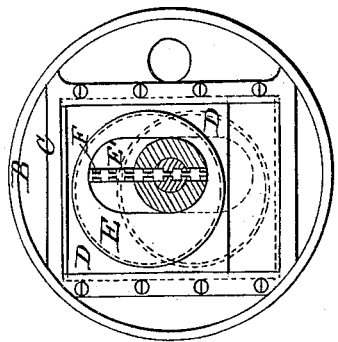
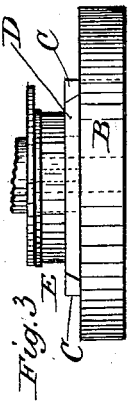
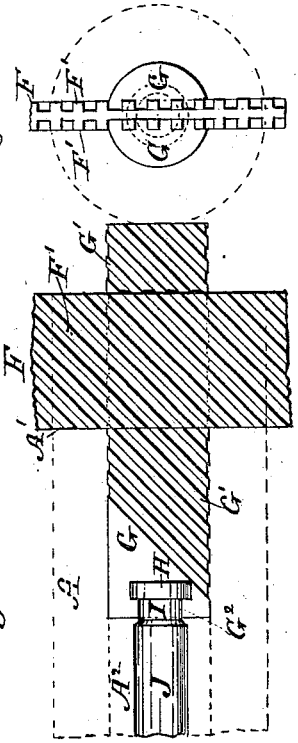
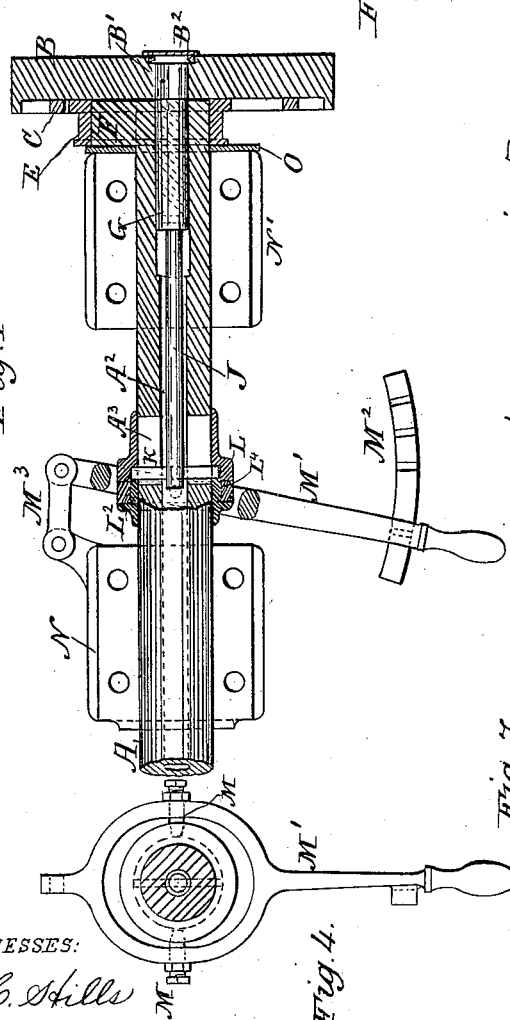
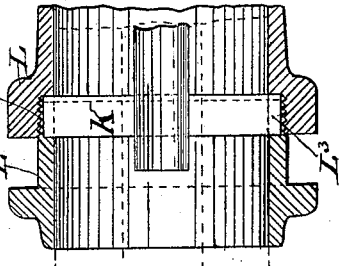
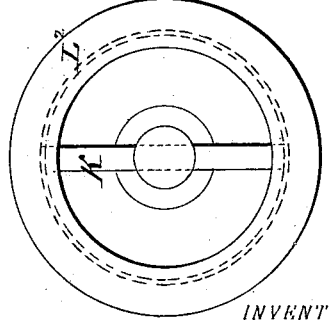
WITNESSES:
L. C. Hills
W. B. Masson
INVENTOR:
Abraham B. Landis,
by E. E. Masson,
Attorney.

(No Model.) 2 Sheets—Sheet 2.
A. B. LANDIS.
VALVE GEAR.
No. 308,079. Patented Nov. 18, 1884.
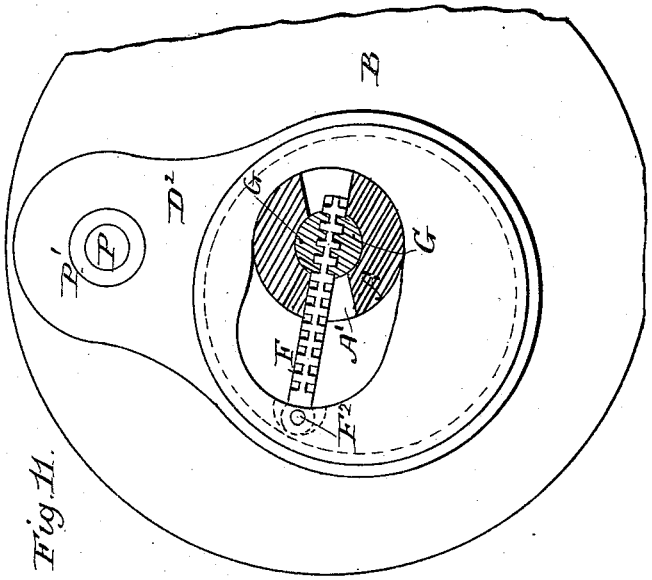
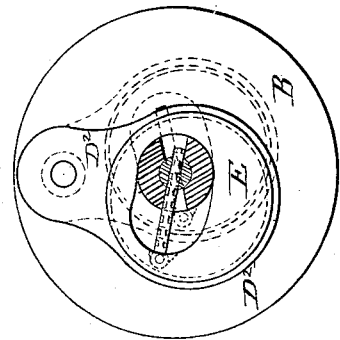
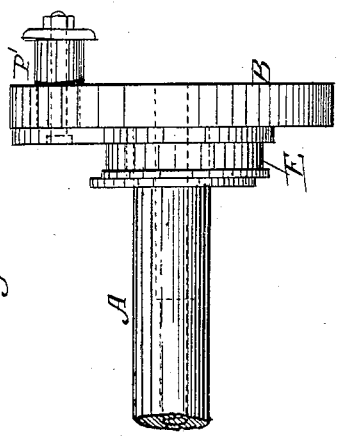
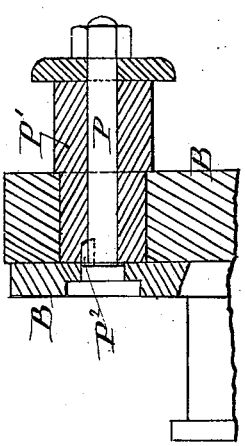
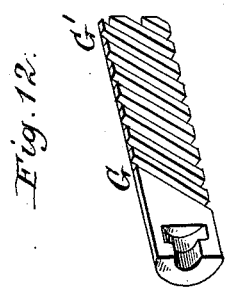
WITNESSES:
L. C. Hills
W. B. Masson
INVENTOR
Abraham B. Landis,
by E. E. Masson
Attorney

UNITED STATES PATENT OFFICE.

ABRAHAM B. LANDIS, OF WAYNESBOROUGH, PENNSYLVANIA.

VALVE-GEAR.

SPECIFICATION forming part of Letters Patent No. 308,079, dated November 18, 1884.

Application filed June 3, 1884. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Valve-Gears, of which the following is a specification, reference being had therein to the accompanying drawings.

This invention has relation to means employed for the purpose of shifting an eccentric for the purpose of varying the throw of a valve or for reversing the engine; and the invention consists in certain features of construction, hereinafter described, and specifically pointed out in the claims.

Referring to the drawings, Figure 1 is a plan, partly in section, of details of a shifting eccentric and its adjuncts sufficient in extent for a clear understanding of the invention. Fig. 2 is a face view of the eccentric, showing the shaft in section. Fig. 3 is an edge view of the parts shown of Fig. 2. Fig. 4 is an end elevation of the left-hand portion of Fig. 1, the shaft being shown in section. Fig. 5 is an enlarged detail, certain parts being shown in section. Fig. 6 is an end elevation of the right-hand portion of Fig. 5; Fig. 7, a similar view of the left-hand portion of Fig. 5. Fig. 8 is a side elevation, Fig. 9 an end elevation, of one modification of my invention. Fig. 10 is an enlarged detail hereinafter described; Fig. 11, another modification of the invention; Fig. 12, a perspective view of one of the ribbed bars.

Like letters indicate like parts in all the figures.

A indicates a driven shaft of an engine, on which is mounted a crank or other disk, B, having upon its face a frame, C, the inner faces of which are beveled to receive a beveled edged sliding base-piece, D, secured to or formed as a part of the eccentric E. The eccentric and base-plate are slotted, as at E', in order that they may be thrown across a shaft to vary the throw of the valve or to reverse the engine by means of the usual eccentrics, strap, and connecting-rod mounted upon the eccentric E, and connected with the valve of an engine.

The means employed for varying the position of the eccentric consists of a bar, F, having ribs F' upon each of its sides, and extending diagonally across the same. (See Figs. 5 and 6.) This bar F passes through a slot, A', formed in the shaft, and is arranged within the eccentric E, so that when the bar is moved within the slot and across the shaft the eccentric and plate D are also moved therewith. The shaft A is bored centrally and longitudinally, as at $A^2$, (or it may be cored centrally and transversely,) for the reception of the means employed for moving the plates F across the shaft. The principal device employed for that purpose are two semi-cylindrical bars, G, ribbed upon their flat faces diagonally, as at G', to gear and mesh with the ribs F' of the plate F. At the inner end of the bars G there is formed a countersunk recess, $G^2$, adapted to receive the cylindrical head H and the reduced body portion I of the operating-rod J arranged within the central bore of the shaft A. The opposite end of the rod J is slotted for the reception of a key, K, which is passed through a slot, $A^3$, formed in the shaft A, and which key is held in place by means of a collar, L, interiorly screw-threaded, as at L', to receive the screw-threaded flange $L^2$ of a companion collar constituting a circumferential slide adapted to receive the sleeve $L^4$, in the periphery of which are inserted the conical ends of adjustable screws or trunnions M of an operating lever, M', the free end of which runs over a notched sector, $M^2$, serving to hold the lever in different positions for the purpose of determining the extent of the longitudinal movement of the bars G within the shaft, and the consequent position of the eccentric by reason of said movement. The collar $L^2$ is longitudinally slotted, as at $L^3$, for the reception of the ends of the key K. The pivotal end of the operating-lever M' is connected by a link, $M^3$, to a bearing, as N. A second bearing, as N', is herein shown near the eccentric; but it is evident that my improvements are equally adapted to shafts of engines having the eccentric between the bearings. Now, it will be noticed that by first entering the rod J partly within the bore of the shaft A and applying to the head thereof the two bars G, so as to embrace said head, and then entering said bars within the bore of the shaft through the opening B' formed in the disk B, that said bars G are provided with a long bearing within the shaft, and that the ribbed plate F may then be inserted through its slot A' in the shaft, and be made to mesh with the ribs and grooves of the bars G', and being forced entirely through the shaft, the bearings moving longitudinally therein as the plate is forced therein between them. A dust-guard, O, is also placed between the bearing N' and the eccentric E, the dust-guard being a plate of suitable material, apertured to fit the shaft loosely and extending beyond the opening in the body of the eccentric, so as to exclude all dust and dirt from getting within the eccentric to clog or wear the parts arranged therein. A cap, B², is screwed or otherwise secured within the opening B' to prevent the entrance of dust therein at the end, and the flange of the collar L² covers the slot A³ and excludes dust therefrom. The frame C is now secured to the face of the disk by screws or bolts. The key K is inserted in the slot A³, and through the slot formed in the connecting-rod J the collar L² is moved up to the key, its ends resting in the slots L³, and the collar L is screwed onto the collar L², the trunnions M having been interposed between the two. The parts are now in operative position. By throwing the free end of the lever along the sector the bars G are reciprocated, and by reason of the incline ribs thereon meshing with the similar ribs on the bar F the eccentric is thrown across the shaft to any desired extent, and is retained in such position by means of the notches in the sector.

In Figs. 8 to 11 the eccentric E is suspended upon a bolt, P, passing through the eccentric base-piece D² and the disk B. A sleeve, P', is inserted to give strength and a sufficient bearing for the proper suspension of the eccentric, and also serving as the wrist-pin or the means of connecting a rod with the disk and with a piston-rod of an engine. In other words, the eccentric is suspended upon the wrist-pin of the disk B by the construction shown, the spline P² serving the purpose of retaining the bolt and wrist-pin from rotation. In this construction the rib-bar F is pivoted at F² to the eccentric, and the slot A' in the shaft A is made wider at the periphery of the shaft in order to allow for the pivotal motion of the bar F, while the rib-bars G are arranged concentrically in the shaft, as in the first arrangement described.

It is apparent that the bore of the shaft may be cylindrical, as shown, for convenience of manufacture, or it may be of other shape in cross-section, and that instead of setting the head of a connecting-rod in the ribbed-plate operating-bars other connections may be devised and substituted. In either case the advantage of a positively central point of government of the eccentric is attained by my invention, and by that means which operates upon both sides of the directly-acting governing-plate, whereby a greater amount of bearing surface is obtained, consequently great durability, and a positive smooth movement is produced in the eccentric and with the least amount of friction.

Having described my invention and its operation, what I claim is—

1. In a shifting eccentric, a governing-plate arranged within and across the shaft, and provided with diagonally-disposed ribs upon its opposite faces, in combination with diagonally-ribbed bars arranged with the shaft, substantially as specified.

2. In a shifting eccentric, a governing-plate ribbed upon its opposite sides, in combination with semi-cylindrical bars ribbed upon their flat faces and having seats in said faces for the head of an operating-rod, substantially as specified.

3. The combination of a centrally-bored shaft, an operating-rod, a semi-cylindrical ribbed plate arranged in the bore, and a governing-plate ribbed upon opposite sides and arranged cross the shaft and between the semi-cylindrical bars, substantially as specified.

4. The combination, with the eccentric having a governing-plate provided with ribs upon its opposite faces arranged therein, a slotted and bored shaft, semi-cylindrical ribbed plates, and a dust guard or guards, substantially as specified.

5. The combination of the bored and slotted shaft, an eccentric mounted therein, a governing-plate arranged within the eccentric and passing through the shaft, bars having ribs adapted to mesh with the ribs of the governing plate, and an operating-rod connecting with the bars and with a sliding collar mounted on the shaft, together with means for operating the collar, substantially as specified.

6. The combination of the eccentric E, the governing-plate F, provided with ribs F', the shaft A, and the bars G, provided with ribs G', substantially as shown and described.

7. The combination of the eccentric E, the frame D, the disk B, the plate F, the bars G, rod J, the shaft A, collars L L², key K, lever M', link M³, and bearings, substantially as shown and described.

In testimony whereof I affix my signature in presence of two witnesses.

ABRAHAM B. LANDIS.

Witnesses:
D. M. GOOD, Jr.,
JESSE F. DURBIN.